United States Patent
Loeffler et al.

(10) Patent No.: US 7,376,098 B2
(45) Date of Patent: May 20, 2008

(54) METHOD AND DEVICE FOR ACCESS CONTROL TO A WIRELESS LOCAL ACCESS NETWORK

(75) Inventors: Siegfried Loeffler, Paris (FR); Philippe Laine, Issy-les-Moulineaux (FR); Philippe Sehier, Saint Germain en Laye (FR)

(73) Assignee: ALCATEL, Paris (FR)

( * ) Notice: Subject to any disclaimer, the term of this patent is extended or adjusted under 35 U.S.C. 154(b) by 728 days.

(21) Appl. No.: 10/482,820

(22) PCT Filed: May 20, 2003

(86) PCT No.: PCT/FR03/01512

§ 371 (c)(1),
(2), (4) Date: Jan. 5, 2004

(87) PCT Pub. No.: WO03/103221

PCT Pub. Date: Dec. 11, 2003

(65) Prior Publication Data

US 2004/0196806 A1 Oct. 7, 2004

(30) Foreign Application Priority Data

May 30, 2002 (FR) ................................. 02 06641

(51) Int. Cl.
*H04Q 7/20* (2006.01)
(52) U.S. Cl. ....................... 370/329; 370/338; 370/401
(58) Field of Classification Search ............... 370/329, 370/338, 401
See application file for complete search history.

(56) References Cited

U.S. PATENT DOCUMENTS

| 2003/0169713 A1* | 9/2003 | Luo ........................... 370/338 |
| 2004/0203732 A1* | 10/2004 | Brusilovsky et al. .... 455/426.1 |
| 2004/0233893 A1* | 11/2004 | Zhou et al. ................. 370/352 |
| 2005/0117590 A1* | 6/2005 | Ronneke ................ 370/395.52 |

FOREIGN PATENT DOCUMENTS

| EP | 1 191 763 A2 | 3/2002 |
| EP | 1 207 708 A1 | 5/2002 |
| GB | 2313257 A | 11/1997 |

* cited by examiner

*Primary Examiner*—William Trost
*Assistant Examiner*—Julio Perez
(74) *Attorney, Agent, or Firm*—Sughrue Mion, PLLC

(57) ABSTRACT

A device is dedicated to controlling access to wireless communications local area networks having a local coverage area included in a main coverage area of a main communications network equipped with mobile communications device positioning means. The device having management means connected to the positioning means and adapted i) to compare the positions of at least some of the mobile devices to those of the local areas, in order to select the primary identifiers of the mobile devices substantially positioned in said local areas, and ii) to send a messaging server of the main network instructions including the primary identifier of each mobile device selected, in order for it to send them a message telling their users that they can connect to the local area network in whose local area they are placed.

21 Claims, 1 Drawing Sheet

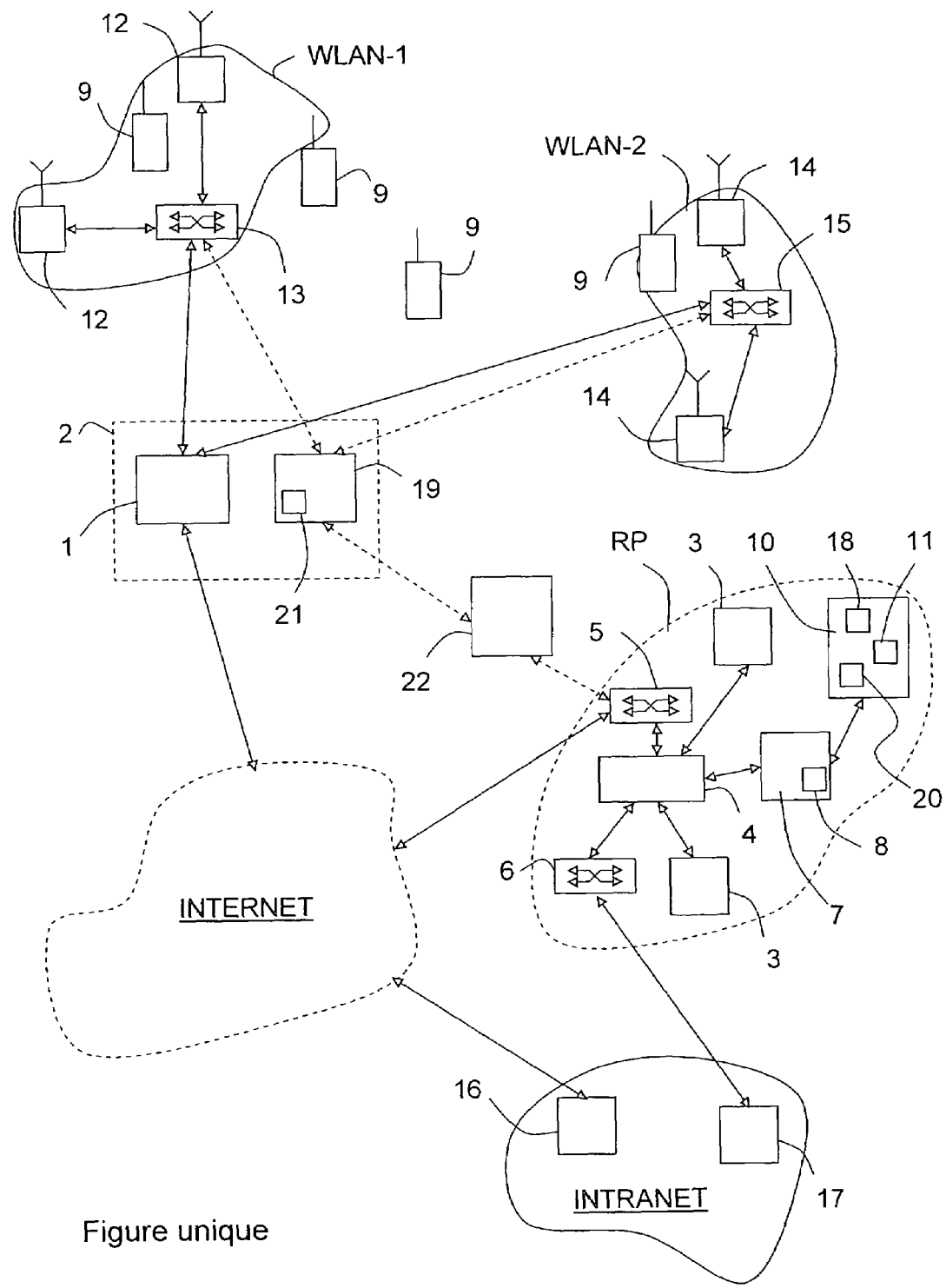
Figure unique

METHOD AND DEVICE FOR ACCESS CONTROL TO A WIRELESS LOCAL ACCESS NETWORK

FIELD OF THE INVENTION

The field of the invention is that of communication between terminals in networks, and more particularly controlling access to a wireless local area network.

BACKGROUND OF THE INVENTION

Mobile telephone operators make many services available to their customers who are provided with mobile communications devices, including services giving access to public networks such as the Internet and private networks such as Intranet company networks. However, because of the high density of mobile device used simultaneously in places known as "hot spots", such as train stations and airports, access times to these services are often long and interruptions are relatively frequent.

One prior art solution for solving this problem consists in enabling some mobile devices to connect to wireless local area networks (WLAN) that are already installed, in particular in some hotspots, and are connected to the Internet via an access provider and are sometimes connected to Intranet networks via the Internet. However, in order to be able to connect to a WLAN, a user must be aware that he is in the coverage area of a WLAN to which he is entitled to connect his mobile device.

Also, the WLAN must be able to authenticate the user, whose mobile device must be provided not only with the standard hardware for accessing that type of network, for example a removable or integrated WLAN card, but also with specific additional hardware, and in particular a device for reading a second SIM card adapted to ensure that use by the end user is sufficiently secure. The specific additional hardware increases the overall size and/or weight of the mobile device. Moreover, the user must obtain it himself, as it is not installed as standard.

The document GB 2 313 257 describes a method enabling a user to determine if he is in the coverage area of a WLAN, but in that case it is the user who must take the initiative and set up a call to a server connected to the main network in order to find out if he is in the coverage area of a local area network he is entitled to access. Either the terminal determines the user's position (for example using a GPS receiver), and the user indicates his position to the server, which then takes account of that position and, where appropriate, supplies data identifying one or more local area networks whose coverage areas include the position of the terminal, or the server provides data that defines coverage areas of existing local area networks at numerous positions, in which case the terminal must then itself compare its position with the coverage areas of the local area networks, to determine for itself if it is in a coverage area. That prior art method has the drawback of requiring the user to take the initiative to set up a call to a server.

SUMMARY OF THE INVENTION

An object of the invention is therefore to solve some or all of the above-mentioned problems. To this end it proposes a method of controlling access to a wireless communications local area network (WLAN-i) having a local coverage area at least part of which is within a main coverage area of a main communications network, the method comprising the steps of:

determining the position of at least some of the mobile communications devices belonging to customers of said main network present in said main area, detecting mobile devices whose position is within the local coverage area of the wireless communications local area network, and sending a mobile device that has been detected, via said main network, a message telling its user that it is in the local area of a local area network to which it can connect;

which method is characterized in that:

to detect a mobile device whose position is within the local coverage area of the wireless communications local area network, management means of the main network compare the position of each mobile device to the position of at least one local area, and to send a message to a mobile device that has been detected, said management means of the main network make a selection from the primary identifiers that identify mobile devices positioned in said local area.

In this context, the expression "substantially positioned in the local area" means either within the local area or in the proximity (or vicinity) thereof. Moreover, in the present context, the expression "mobile communications device" refers to any mobile device (or terminal) that can receive messages from the main network of the mobile telephone operator for his mobile device, which preferably includes means for access to a wireless local area network (WLAN). This is not essential, however. The mobile device that receives the message can be a "standard" mobile telephone, for example, belonging to a person having another mobile device equipped with means for accessing a wireless local area network, for example a portable microcomputer or a personal digital assistant (PDA) equipped with a removable or integrated card conforming to a standard of the 802.11 type.

Thus there is no need for the customer/user to adapt his mobile device specially. Each time he is within, or in the proximity of, a wireless local area network, he automatically receives a message, such as an SMS (Short Message Service) message, for example, from the telephone operator of the main network of which he is a customer, on one of his mobile devices. He can then request access to a service via the wireless local area network.

After the phase of selecting primary identifiers, a first table listing the correspondences between mobile device primary identifiers and access authorizations (or benefits) in respect of the local area networks is preferably accessed in order to retain from the selected primary identifiers those that have an authorization to access the local area network in whose local area the associated mobile device is positioned. In this case, messages are sent only to the mobile devices whose primary identifiers have been retained.

The access request preferably includes an identifier authentication procedure. To this end, each message may include a secondary identifier, such as a password, preferably for single use, that has to be given to the wireless local area network on attempting to connect the mobile device to that local area network. A second table listing the correspondences between secondary identifiers and tertiary identifiers, such as user names, is then provided, and is accessed on receiving a secondary identifier, associated with a tertiary identifier, to effect the authentication. Then, if authentication is successful, the mobile device is authorized to access the local area network. This authorization can be given either for a session of unlimited duration or for a session limited in terms of either its duration or the volume of data transmitted.

Moreover, in the event of a request to access a secure private network via a wireless local area network, a secure connecting tunnel, such as an IPsec tunnel, is preferably set up between the private network and the local area network.

Furthermore, in the event of access by a mobile device to a chargeable service via a local area network, payment data relating to said service may be recovered in order to bill it via its main network.

The invention also relates to a device for controlling access to a wireless communications local area network having a local coverage area at least part of which is included in a main coverage area of a main communications network equipped with mobile communications device positioning means, such as a Location Based Service (LBS).

The device is characterized in that it includes management means that are connected to the positioning means and are adapted to:
  compare the positions of at least some of the mobile devices to that of at least one local area, in order to select the primary identifiers of the mobile devices positioned substantially in said local area, and
  send a message server of the main network of each selected mobile device instructions including its primary identifier in order for it to send to said mobile device, via its main network, a message telling its user that it is in the local area of a local area network to which it can connect.

The device preferably also comprises a first memory for storing a first table listing the correspondences between primary identifiers of mobile devices and local network access authorizations (and/or benefits). In this case, the management module is connected to the first memory and adapted to access the first correspondence table to retain the selected primary identifiers that have an authorization to (and/or a benefit from) access the local area network in whose local area the associated mobile device is positioned.

The management means are preferably adapted to send the messaging server concerned instructions also including an assigned secondary identifier, such as a password, that is specific to the user of the mobile device retained or selected, and has to be given by the mobile device corresponding to one of the access points of the local area network in which it is positioned, in the event of an attempt to connect to said local area network. In this case a second memory is provided that is connected to the management means and stores a second table listing the correspondences between the assigned secondary identifiers and associated tertiary identifiers. The second memory is preferably adapted to eliminate from the second table each secondary identifier that the associated mobile device has used to access a local area network.

The invention further provides a communications installation comprising a main communications network, a wireless communications local area network, and a device of the type described hereinabove.

The installation preferably comprises an authentication server that includes the second memory and is adapted, on receiving a tertiary identifier and a secondary identifier, to execute an identifier authentication procedure based on comparison with identifiers stored in the second table. In this case, each local area network includes an access point able, on receiving a secondary identifier associated with a tertiary identifier, firstly, to send the authentication server a request for authentication of the secondary and tertiary identifiers received, and, secondly, in the event of authentication by the authentication server, for authorization of the mobile device designated by the tertiary identifier to access the local area network in which it is positioned.

The installation may also comprise one or more secure private networks that are preferably connected to a main network and to the Internet and each comprise an access server and connecting means connected to the networks and able, in the event of a request to access a secure private network via one of the wireless local area networks, to set up a secure tunnel between the private network and the local area network.

The installation may further comprise a billing server adapted, in the event of access to a chargeable service by a mobile device via one of the local area networks, to recover payment data relating to said service and to send an invoice representative of said service to a management server of the main network of which the user of the mobile device is a customer.

Moreover, each local area network is preferably connected to the Internet public network via an access server of an access provider.

The invention may be implemented in many types of private or public communications network, and in particular in wireless local area networks (WLAN) and communications networks for mobile devices offering messaging and location services, such as in particular GSM, GPRS and UMTS networks, and satellite access networks, such as Thuraya and Iridium.

Other features and advantages of the invention will become apparent on reading the following detailed description of an embodiment.

BRIEF DESCRIPTION OF THE DRAWINGS

The single FIGURE depicts, diagrammatically, one embodiment of an installation of the invention. This FIGURE is for the most part of a specific nature and consequently can constitute part of the description of the invention as well as, if necessary, contributing to the definition of the invention.

DETAILED DESCRIPTION OF THE INVENTION

The communications installation of the invention includes at least one main (radio)communications network RP belonging to a mobile telephone operator, an Internet Protocol public network, at least one Internet access server 1 of an access provider, and at least one wireless local area network WLAN-1, which is preferably connected to the Internet access server 1. The dashed outline rectangle 2 in the FIGURE represents all the access providers.

The main network RP is installed (or deployed) in a main geographical area, such as a country. This network is a GSM, GPRS or UMTS network, for example. This type of network does not constitute the subject matter of the invention and is familiar to the person skilled in the art, and is therefore not described in detail here. Broadly speaking, it includes a multiplicity of base transceiver stations (BTS) 3, as they are known in a GSM (or GPRS) network (in a UMTS network they are known as Nodes B), each associated with a cell covering a portion of the main area and connected directly or indirectly to a plurality of types of terminals 4, 5 and 6 that are also referred to as nodes. The nodes in a GPRS network are, for example, a service GPRS serving node (SGSN) 4, base station controllers (BSC) in the case of 2 G or 2.5 G networks or radio network controllers (RNC) in the case of 3 G networks, connected to the SGSN 4, a gateway GPRS serving node (GGSN) 5 connected to the SGSN 4 and to the Internet, and a core network (CN) 6 connected to the SGSN 4 and to at least one Intranet private network (see below).

Moreover, in the example shown, the SGSN 4 is also connected to a location server 7 comprising a positioning module 8 adapted to detect and to store the positions of the mobile communications devices (or terminals) 9 of customers of the main network RP, as well as, for example in GSM and UMTS networks, and is further connected to a home location register (HLR) containing a customer database for the main network RP. For example, the mobile devices 9 are mobile telephones, portable microcomputers, or personal digital assistants (PDA), which have associated primary identifiers such as telephone numbers, messaging addresses, or any other identifiers distinguishing them from each other and enabling messages to be sent to them.

In the example discussed here, the location server 7 is finally coupled to an intelligent network (IN) type services server 10 equipped with a location services module 11 such as a location based services (LBS) module. The intelligent network services server 10 is connected to the HLR and is used to introduce new services and new functions into the main network RP, using an additional layer of intelligence installed between the switches/routers and the services applications, and without modifying the structure of the main network. The location services module 11 is adapted to provide any type of service relating to the location of customers' mobile devices 9, and therefore works in collaboration with the location server 7.

In a different embodiment, the location server 7 could be dispensed with by installing the positioning module 8 in the services server 10. Having the location services module (or LBS module) 11 itself provide the position detection and storing function of the positioning module 8 can also be envisaged. In this case, the services server 10, and consequently its location services module 11, are connected to the HLR and/or to the SGSN 4 by standard mechanisms of the intelligent network IN.

By means of the main network RP, the mobile telephone operator's customers can set up connections between their mobile communications devices 9 and remote fixed or mobile communications devices. They can in particular access the INTERNET, possibly via the Internet access server 1 of an access provider, or a private network such as the network labeled INTRANET in the FIGURE.

Naturally, there is usually a plurality of main networks belonging to different operators in the same geographical area, each of the main networks having its own customers.

The first wireless local area network WLAN-1 is, for example, installed (or deployed) in an airport, called the first local area and included within the main area. This is a wireless local area network (WLAN), for example, with one or more access points 12 to which mobile communications devices 9 can connect by radio if they are equipped with hardware for connecting to a wireless local area network (for example a removable or integrated PC WLAN card or PDA WLAN card conforming to the 802.11 standard). The access points 12 are connected to an access router 13 that is itself connected to the Internet access server 1 of an access provider.

In the example shown in the single FIGURE, the installation also includes a second wireless local area network WLAN-2 that is preferably connected to the Internet access server 1 and to the private network INTRANET.

The second wireless local area network WLAN-2 is of the same type as the first wireless local area network WLAN-1, for example. It is installed (or deployed) in a area including a train station, called the second local area and included within the main area, for example. Its access points 14 are connected to an access router 15 that is itself connected to the Internet access server 1 of an access provider, which here is the same one as the first wireless local area network WLAN-1, although it could be another access server.

For example, the private network INTRANET is a company network equipped with a first firewall server 16, preferably of the IPsec Firewall/Gateway type, for secure access to the INTERNET, and possibly with a secure second firewall server 17 connected to the node 6 of the main network RP. By means of the two firewall servers 16 and 17, a customer of the main network RP who works for the company owning the private network INTRANET can connect remotely to that network via said main network RP and to the INTERNET via said private network INTRANET.

In the example shown, the networks are depicted by closed curves representing their respective coverage areas. Because the coverage areas of the INTERNET and of the main network RP are much larger than, and include, those of the other networks, they are shown in dashed outline.

In the example shown, the installation of the invention includes a device adapted to control access to the two wireless communications local area networks WLAN-1 and WLAN-2.

To be more precise, the device is adapted to set up connections between the mobile devices 9 of certain customers of the main network RP and the Internet and/or the private network INTRANET via one of the wireless local area networks WLAN-i (here, i=1, 2). As a result, the level of quality of the services offered by the operator of the main network RP can be maintained, or even improved, in particular if the WLAN offers a greater bandwidth than the main network RP. Naturally, as mentioned above, this type of access relates only to customers having a mobile communications device 9 equipped with the standard hardware for connecting to a wireless local area network (for example a removable or integrated PC WLAN or PDA WLAN card conforming to the 802.11 standard).

To achieve this objective, the device of the invention preferably has a first memory 18 storing a first table listing the correspondences between primary identifiers of mobile devices 9 of a main network RP and authorizations to (and/or benefits of) access to the wireless local area networks WLAN-i. In this first table, a primary identifier can, for example, be associated with a plurality of wireless networks if the corresponding customer has negotiated a plurality of access authorizations (and/or benefits) with the operator of the main network RP. As mentioned above, this primary identifier does not necessarily designate the mobile device able to connect to a wireless local area network. This may be the case, but it can equally designate a first mobile device, in the form of a mobile telephone, belonging to a customer who also has a second mobile device able to set up the above-mentioned connection, such as a PDA or a microcomputer, for example.

When there is a plurality of operators, as is generally the case, a first memory 18 is provided for each operator's main network. This memory is preferably installed in a server of the operator, for example the services server 10, as shown in the FIGURE. A copy of each first table can also be stored in a server 19, for example an authorization, authentication, accounting (AAA) server common to the various Internet access providers. The device of the invention includes a management module 20 connected to the positioning module 8, the location services module 11, and the first memory 18, when present.

The management module 20 is preferably installed in the operator's services server 10, but could be installed in another server of the operator, such as the location server 7, for example. To be more precise, it is preferable to install the management module, which is adapted to effect a plurality of operations, in the same server as the first memory 18.

A first operation compares the positions, as supplied by the positioning module 8 of the location server 7, of the mobile devices 9 listed as being able to connect to the wireless local area networks WLAN-i or as being associated with another mobile communications device able to make that type of connection, to the positions of the first and second local areas, in order to select those that are substantially within or in the vicinity of one of the local areas.

A second operation sends a module responsible for location messaging within the main network RP to which the selected mobile devices 9 are connected instructions including at least their primary identifier and a code instructing the module to send each mobile device 9 designated by one of the primary identifiers received, via the main network RP, a message telling its user that it can connect to the wireless local area network WLAN-i in which it is positioned or whose local area it is about to enter. This module is preferably the location services module 11 installed in the intelligent services server 10, especially if the module 11 is of the LBS type.

If the module 11 if of the LBS type and is connected to the HLR that contains the database for the customers of the main network RP, it is possible to envisage the management module 20 sending it all the primary identifiers of the mobile devices detected, in order for it to decide to send messages only to mobile devices associated with a primary identifier in a list stored in a memory or in the first table, for example in corresponding relationship to a WLAN access authorization.

If a first correspondence table is provided, the management module 20 is preferably adapted to effect a third operation between the first and second operations. The third operation consists in accessing the first correspondence table stored in the memory 18 to determine, on the basis of the primary identifiers associated with the mobile devices 9, which of the selected mobile devices 9 have an access authorization (and/or benefit) in respect of the local area network in whose local area they are positioned. Consequently, these primary identifiers are those retained (or selected) at the time of this determination. In this case, messages are sent only to the mobile devices whose primary identifiers have been retained.

On receiving instructions, the location services module 11 generates a specific message for each mobile device 9 selected or retained. These messages are preferably Short Message Service (SMS) messages, but could equally be electronic mail messages.

When a customer receives a message on his mobile device 9, he can attempt to connect to the wireless local area network WLAN-i in whose local area he is positioned to obtain information internal to that network, to connect to the INTERNET, or possibly to connect to his company network INTRANET.

Two situations can be envisaged, according to whether the mobile device 9 is actually able to connect to the WLAN-i or is not able to make that type of connection itself but belongs to a customer who also has a PDA or a portable microcomputer equipped for making that type of connection. In the latter situation, the customer receives on his standard mobile telephone 9 the (SMS) message sent by his main network RP and must attempt to connect using his appropriately equipped PDA or microcomputer 9.

It is not absolutely necessary for the detected mobile device 9 to be within a local area already. Having the detection operation integrate the concept of a threshold distance can be envisaged. Thus the mobile device can be sent a message if it is at a distance from the border of a local area less than the threshold distance. This facility can in particular be used to advise the user that he is on the point of entering a local area, or is in the proximity of a local area, in which he could attempt to connect to the associated wireless local area network. By means of the invention, a customer can go to a nearby local area specifically to set up a connection that he cannot set up outside that area. Consequently, having the message include information representative of the distance between the mobile device 9 and the border of a local area can be envisaged. Consequently, having the message comprise information enabling the user to find his nearby local area, whose presence is signaled to him, can be envisaged.

The customer's mobile device 9 is connected to the wireless local area network WLAN-i via his nearest access point 12 or 14. The access point 12 or 14 then sends a web type home page to the mobile device 9 so that it can display information specific to the wireless local area network WLAN-i and/or connect to the Internet or to an Intranet network via the Internet access server 1 to which the router 13 of the wireless local area network WLAN-i is connected.

The connection to the Internet or to an Intranet network is preferably effected in a secure manner. To this end, the messages sent to the retained (or detected) mobile devices can incorporate a secondary identifier, such as an alphanumeric password.

The password is preferably assigned by the management module 20, and is drawn at random, for example. In this case, the secondary identifier is sent to the location services module 11 with other message generation instructions. The secondary identifier is preferably stored in a second table in corresponding relationship to a tertiary identifier that can be a user name or a primary identifier. The second table is stored in the first memory 18, for example. For fast processing, it is also preferable to store a copy of the second tables specific to the various operators in a second memory 21 of the server 19 common to the various Internet access providers. This is particularly beneficial if the server 19 is of the AAA type, since a server of this type is designed in particular to carry out authentication procedures. In this case, to enable transfer of the second tables from the main networks to the AAA server 19, a server 22 is provided, for example a proxy server, and is preferably connected to the GGSN 5 of each main network RP and to the AAA server 19. If an authentication procedure is envisaged, the access points 12 and 14 of the wireless local area networks WLAN-i must be adapted to supply to the mobile devices 9 a home page prompting the user to enable the secondary identifier that he has received from his main network RP, and where applicable his user name (tertiary identifier). Some access points, including those sold by the company COLUBRIS, are equipped for this purpose.

Once in possession of the secondary and tertiary identifiers, the access point 12 or 14 sends the AAA server 19 an authentication request via the router 13 or 15. This request is preferably sent in the form of the web page enriched with the identifiers supplied by the user. It is preferably transmitted in accordance with the secure hypertext transfer protocol (HTTPS). On receiving this request, the authentication module extracts the secondary and tertiary identifiers that it contains and compares them to those stored in the second table in the second memory 21. When the authentication module has terminated its authentication procedure, it generates a connection authorization or prohibition.

In case of an authorization, the access point 12 or 14 concerned provides the mobile device 9 with access to the available services. If the user sends the access point an INTERNET access request, his mobile device 9 is then connected to it via the router 13 or 15 of the WLAN-i and via the access server 1 to which said router is connected. If the user sends the access point a request for access to a private network, for example the company network INTRANET, then it is preferable to set up a secure link (or secure tunnel) beforehand between the WLAN-i and the firewall/gateway server 16 of the network INTRANET via the Internet. The secure tunnel preferably uses a Virtual Private Network (VPN) Secure Internet Protocol (IPsec), to which the connection of remote private networks via an IP public network is suited. Naturally, the firewall/gateway server 16 must be compatible with this type of secure protocol.

The secondary identifiers are preferably for single use, so that they allow only one connection of a mobile device 9 to a wireless local area network WLAN-i. At least four solutions can be envisaged for implementing this function. A first solution consists in eliminating the (secondary identifier, tertiary identifier) pair from the second table as soon as the corresponding connection authorization has been given. A second solution consists in waiting for the mobile device 9 to be disconnected from an access point 12 or 14 to send a request to eliminate the pair associated with that device to the server 19, in which the second memory 21 is preferably installed. Disconnection can be detected by observing the traffic. For example, a time out can be applied when there is no longer any traffic. A third solution consists in authorizing access to a WLAN for a chosen limited time period, for example one hour, independently of the connection number. In this case, elimination of the pair in the second memory 21 is instructed when the time period has expired. A fourth solution consists in eliminating the pair in the second memory 21 when a certain quota of data has been transmitted, independently of the connection number.

By means of this type of connection via a WLAN, a mobile telephone operator's customer can in particular send or receive electronic mail or access private information without going via his operator's main network RP.

If the user accesses chargeable services via the WLAN, service billing information is collected by a collection module that is preferably installed in the server 19 common to the access providers. This is particularly beneficial if the server 19 is of the AAA type, since it then already incorporates this kind of collection module.

Once collected, the billing information is sent to the operator of which the user is a customer.

The management module 20 can take the form of electronic circuits, software (or data processing) modules, or a combination of circuits and software.

In the installation of the invention, either equipping each operator with a device or providing a device common to all the operators can be envisaged. Here the term "device" means at least one management module that can be connected to the first table and to a positioning module 8 for detecting and storing the nominal positions of the mobile communications devices 9 of the customers of a main network RP, installed in an HLR type location server, for example, and a location services module 11, such as a LBS, for example installed in a services server 10 of the intelligent network type. The device can equally include a first table listing the correspondences between primary identifiers and authorizations to access wireless local area networks stored in a first memory 18 and/or a second table listing correspondences between secondary identifiers and tertiary identifiers stored in a second memory 21.

Moreover, the foregoing description alludes to a mobile device 9 belonging to a user who is a customer of a main network RP operator. However, having certain mobile devices belong to users who are not customers of the operator of a main network RP, and who therefore cannot be located by that operator, can be envisaged. Two solutions can be envisaged to enabling such persons to connect to the wireless local area network WLAN-i in the local area in which they are positioned.

A first solution consists in making scratch cards containing a secondary identifier, such as an alphanumeric password, and possibly a user name, available to potential users, preferably at points of sale in the local areas concerned (although they could be elsewhere).

A second solution consists in providing a voice server that can be accessed via a payphone, for example, by dialing a dedicated premium rate number (of the 0836 type). When the connection with the voice server has been set up, the server supplies the caller with a secondary identifier, such as an alphanumeric password, and possibly a user name.

In both these solutions, once the user is in possession of his password (and where applicable his user name), the user can then use his mobile device, provided with the appropriate connection means, to connect to an access point 12 or 14 of the WLAN-i in whose local area he is positioned. The secondary identifiers (and user names) on the scratch cards or delivered via telephone by the voice server are preferably stored in the second memory 21 of the server 19 so that the authentication procedure can be effected. Operation is subsequently exactly the same as that described hereinabove, except that access to the Internet and/or to an Intranet network via the WLAN-i, or simply to the WLAN-i itself, relates only to free services and is not billed.

The invention also offers a method of controlling access to one or more wireless communications local area networks (WLAN) each having a local coverage area at least part of which is included in the main coverage area of one or more main communications networks.

The method can be implemented by the device and the installation described hereinabove. The main and optional functions and sub-functions provided by the steps of the method being substantially identical to those provided by the various means constituting the device and the installation, only the steps implementing the main functions of the method of the invention are summarized hereinafter. That method consists in:

first of all, detecting the position of at least some of the mobile communications devices that belong to customers of a main network and are present in its main area, then comparing those positions to the positions of the local areas in order to select the primary identifiers of the mobile devices that are substantially in one of the local areas, and sending each selected mobile device, via its main network, a message telling its user that it can connect to the local area network in whose local area he is positioned.

The connection can then be effected either directly or after an authentication step. In the latter case, the messages sent to the mobile devices also include a secondary identifier, preferably for single use.

An additional step can equally be provided, after the step of selecting primary identifiers, consisting in accessing a first table listing the correspondences between mobile device primary identifiers and authorizations to access local area networks, in order to retain those that have an authorization to (or benefit from) access the local area network in whose local area the associated mobile device is positioned. In this case, messages are sent only to the mobile devices whose primary identifiers have been retained.

The invention relates to all main public mobile telephone networks offering messaging and-location services, and in particular to those of the GSM, GPRS and UMTS types, Internet Protocol (IP) networks, private networks, and all wireless local area networks, in particular of the WLAN type. However, it relates equally to satellite access networks such as Thuraya and Iridium.

The invention is not limited to the embodiments of a method, installation and device described hereinabove by way of example only, but encompasses all variants that the person skilled in the art might envisage within the scope of the following claims.

The invention claimed is:

1. A method of controlling access to a wireless communications local area network having a local coverage area at least part of which is within a main coverage area of a main communications network, the method comprising:
   determining the position of one or more of the mobile communications devices belonging to customers of said main network, wherein said mobile devices are present in said main coverage area,
   comparing the positions of the one or more mobile devices to the position of a local coverage area,
   selecting a primary identifier for each of said one or more mobile devices that is positioned in said local coverage area or positioned at a distance from the border of said local coverage area, this distance being less than a determined threshold distance, and
   sending for each selected primary identifier, a message to the corresponding mobile device indicating that the mobile device is substantially in the local coverage area of the wireless communications local area network to which it can connect.

2. The method according to claim 1, characterized in wherein sending the message to the mobile device further comprises, after selecting the primary identifiers, accessing a first table listing correspondences between mobile device primary identifiers and authorizations to access a local area network, retaining the selected primary identifiers that are associated with a local area network authorization, and sending messages to the mobile devices whose primary identifiers have been retained.

3. The method according to claim 1, wherein each message includes a secondary identifier and, in the event of an attempt to connect to the wireless communications local area network, providing the secondary identifier received in the message.

4. The method according to claim 3, wherein if the secondary identifier is associated with a tertiary identifier, on receiving the secondary identifier, accessing a second table listing correspondences between secondary identifiers and tertiary identifiers via said wire less communications local area network, in order to authenticate said association, and, in the event of authentication, authorizing the mobile device to access said wireless communications local area network.

5. The method according to claim 3, wherein the secondary identifier is for a single use.

6. The method according to claim 1, wherein said message is sent using a Short Message Service.

7. The method according to claim 1, wherein in the event of access to a secure private network via said wireless communications local area network, a connection is set up between said secure private network and said wireless communications local area network via a secure tunnel.

8. The method according to claim 1, wherein in the event of access to a chargeable service via said wireless communications local area network, payment data relating to said accessed chargeable service is recovered in order to bill said accessed chargeable service via said main communication network of the mobile device that accessed said chargeable service.

9. A device for controlling access to a wireless communications local area network having a local coverage area at least part of which is included in a main coverage area of a main communications network equipped with mobile communications device positioning means, the device comprising, a management means for managing the main network, wherein the management means is connected to said positioning means and is operable to:
   compare a position of a mobile device to a position of a local coverage area of the wireless communications local area network to determine if the position of the mobile device is within said local coverage area, or positioned at a distance from the border of said local coverage area, this distance being less than a determined threshold distance,
   select a primary identifier of the mobile device positioned in said local coverage area or positioned at a distance from the border of said local coverage area, this distance being less than said determined threshold distance, and
   send a message server of the main communications network instructions including the primary identifier of the selected mobile device in order to send to said mobile device a message that the position of the mobile device is substantially in the local coverage area of the wireless communications local area network to which the mobile device can connect.

10. The device according to claim 9, further comprising, a first memory which stores a first table listing correspondences between primary identifiers of mobile devices and wireless communications local network access authorizations, wherein said management means is connected to the first memory and operable to access the first table to retain the selected primary identifier that has an authorization to access the wireless communications local area network where the associated mobile device is positioned.

11. The device according to claim 9, wherein said management means are operable to send a messaging server instructions including an assigned secondary identifier that is specific to said mobile device, wherein the assigned secondary identifier is retained and given by a mobile device corresponding to an access point of the wireless communications local area network in the event of an attempt to connect to said wireless communications local area network.

12. The device according to claim 11, further comprising a second memory supplied by said management means and operable to store a second table listing correspondences between the assigned secondary identifier and an associated tertiary identifier, the tertiary identifier being supplied conjointly with the assigned secondary identifier.

13. The device according to claim 12, wherein said second memory is operable to eliminate from said second table the secondary identifier that the mobile device used to access said wireless communications local area network.

14. The device according to claim 9, wherein said management means operable to control access to at least two independent local area networks.

15. A communications installation comprising a main communications network and a wireless communications local area network, comprising:
   a device for controlling access to a wireless communications local area network having a local coverage area at least part of which is included in a main coverage area of a main communications network equipped with mobile communications device positioning means, the device comprising, a management means for managing the main network, wherein the management means is connected to said positioning means and is operable to:
   compare a position of a mobile device to a position of a local coverage area of the wireless communications local area network to determine if the position of the mobile device is within said local coverage area, or positioned at a distance from the border of said local coverage area, this distance being less than a determined threshold distance,
   select a primary identifier of the mobile device positioned in said local coverage area or positioned at a distance from the border of said local coverage area, this distance being less than said determined threshold distance, and
   send a message sewer of the main communications network instructions including the primary identifier of the selected mobile device in order to send to said mobile device a message that the position of the mobile device is substantially in the local coverage area of the wireless communications local area network to which the mobile device can connect.

16. The installation according to claim 15, further comprising an authentication server that includes a second memory and is operable to, upon receiving a tertiary identifier and a secondary identifier, execute an identifier authentication procedure based on comparison with identifiers stored in the second table, and wherein the wireless communications local area network includes an access point operable to, on receiving the secondary identifier, i) send said authentication server a request for authentication of said received secondary identifier and said received tertiary identifier, and ii) in the event of authentication by said authentication server, for authorization of the mobile device to access the local area network having the local coverage area in which the mobile device is positioned.

17. The communications installation according to claim 15, further comprising a secure private network that comprises an access server connected to said main communications network and a connecting means connected to said main communications network and said secure private network and operable to, in the event of a request to access the secure private network via said wireless communications local area network, set up a secure tunnel between said secure private network and said wireless communications local area network.

18. The communications installation according to claim 17, wherein said secure private network is connected to a public network.

19. communications installation according to claim 15, further comprising a billing server operable to, in the event of access to a chargeable service by the mobile device via said wireless communications local area networks, recover payment data relating to said accessed chargeable service and to send an invoice representative of said accessed chargeable service to a management server of the main communications network of which a user of said mobile device is a customer.

20. The communications installation according to claim 15, wherein said wireless communications local area network is connected to the public network via an access server of an access provider.

21. The communications installation according to claim 15, wherein said main communications network is connected to the public network.

* * * * *